US006762977B1

(12) United States Patent
Gage et al.

(10) Patent No.: US 6,762,977 B1
(45) Date of Patent: Jul. 13, 2004

(54) LASER ASSISTED MAGNETIC RECORDING APPARATUS AND METHOD

(75) Inventors: Edward Charles Gage, Apple Valley, MN (US); George Robert Gray, Eldersburg, MD (US); Lori Grace Swanson, Bloomington, MN (US); Ronald Evan Gerber, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 215 days.

(21) Appl. No.: 09/660,815

(22) Filed: Sep. 13, 2000

Related U.S. Application Data
(60) Provisional application No. 60/153,633, filed on Sep. 13, 1999.

(51) Int. Cl.[7] .............................................. G11B 11/00
(52) U.S. Cl. ...................................... 369/13.13; 360/59
(58) Field of Search ........................... 369/13.13, 13.33, 369/13.32, 13.17, 44.11, 44.12, 112.01; 360/313, 324, 326, 328, 59

(56) References Cited

U.S. PATENT DOCUMENTS

| | | | | |
|---|---|---|---|---|
| 4,796,226 A | * | 1/1989 | Valette | 365/122 |
| 5,065,390 A | * | 11/1991 | Miyauchi et al. | 369/110 |
| 5,124,961 A | * | 6/1992 | Yamaguchi et al. | 369/13 |
| 5,353,268 A | | 10/1994 | Hintz | |
| 5,440,530 A | * | 8/1995 | Fedeli et al. | 369/13 |
| 5,625,617 A | | 4/1997 | Hopkins et al. | |
| 5,889,641 A | | 3/1999 | Belser et al. | |
| 5,986,978 A | * | 11/1999 | Rottmayer et al. | 369/13.13 |
| 6,016,290 A | * | 1/2000 | Chen et al. | 369/13.13 |
| 6,130,864 A | * | 10/2000 | Burroughs | 369/13 |
| 6,185,177 B1 | * | 2/2001 | Shimano et al. | 369/112 |
| 6,307,832 B1 | * | 10/2001 | Novotny et al. | 369/300 |
| 6,320,841 B1 | * | 11/2001 | Watanabe et al. | 369/300 |
| 6,507,540 B1 | * | 1/2003 | Berg et al. | 369/13.13 |

OTHER PUBLICATIONS

Saga et al., "A New Recording Method Combining Thermo–Magnetic Writing and Flux Detection", International Symposium on Optical Memory, Tsukuba, Japan, Oct. 20–22, 1998, Pd–08.

Nemoto et al., "Exchange–Coupled Magnetic Bilayer Media for Thermomagnetic Writing and Flux Detection", International Symposium on Optical Memory, Tsukuba, Japan, Oct. 20–22, 1998, Pd–09.

Saga et al., "A New Perpendicular Magnetic Recording Method With a Magnetic–Optical Common Preformat", International Symposium on Optical Memory, Tsukuba, Japan, Oct. 20–22, 1998, 13–B–03.

Nemoto et al., "High Density Thermomagnetic Recording on Flux Detectable RE–TM Media", International Symposium on Optical Memory, Tsukuba, Japan, Oct. 20–22, 1998, 13–B–04.

Katayama et al., "New Magnetic Recording Method Using Laser Assisted Read/Write Technologies", International Symposium on Optical Memory, Tsukuba, Japan, Oct. 20–22, 1998, 13–B–05.

* cited by examiner

*Primary Examiner*—Tan Dinh
(74) *Attorney, Agent, or Firm*—Alan G. Towner, Esq; Pietragallo, Bosick & Gordon

(57) ABSTRACT

The present invention provides a hard disk drive laser assisted magnetic recording system including a semiconductor laser and magnetic write coil integrally formed into a slider. The slider preferably includes a perpendicular magnetic recording section adjacent a laser section. The laser section may form an air bearing surface of the slider. During recording operations, laser radiation from the laser section heats a region of the magnetic recording media in order to reduce its coercivity.

20 Claims, 5 Drawing Sheets

LASER ASSISTED MAGNETIC RECORDING APPARATUS AND METHOD

CROSS REFERENCE TO RELATED APPLICATION

This application claims the benefit of U.S. Provisional Application Serial No. 60/153,633 filed Sep. 13, 1999, which is incorporated herein by reference.

FIELD OF THE INVENTION

The present invention relates to magnetic data storage and retrieval systems, and more particularly relates to a laser assisted magnetic recording system.

BACKGROUND INFORMATION

Magnetic based disk drives are well known data storage systems. In magnetic drives, magneto-resistive elements on magnetic heads or sliders are typically used. The development of giant magneto-resistive (GMR) heads has significantly increased the data storage capacity of magnetic disk drives. However, magnetic storage drive technology is subject to the superparamagnetic effect, which limits the areal density of traditional magnetic recording systems.

As an alternative to magnetic drives, optical data storage techniques are known. Efforts in optical storage include laser on a flying optical head, optically assisted magnetic recording, and near-field magneto-optical recording.

The use of a laser on a flying optical head can provide a low cost, compact wafer-based design which allows a very small spot size, but such designs require phase change media which suffer from cyclability and thermal problems. Furthermore, such optical head designs exhibit disadvantages such as poor readout, difficult tracking and limited transfer rates. U.S. Pat. No. 5,625,617, which is incorporated herein by reference, discloses a semiconductor read/write laser design for an optical storage apparatus.

Optically assisted magnetic recording techniques have been proposed. Such techniques could provide relatively high readout signal to noise ratios, high transfer rates and stable recording media. However, disadvantages include problems with thermal/magnetic gradient alignment, domain shape, head complexity and alignment, light delivery complexity and tracking.

Magneto-optical recording designs also have limitations. In conventional magneto-optical (MO) disk drives, data is read as a clockwise or counter-clockwise polarization rotation imposed on a polarized laser light by the up or down orientations of magnetic domains within an area of stored data. The minimum area that the data can comprise is a function of the size of an optical spot formed by the polarized light. The information embedded in the polarization rotation requires an optical readout apparatus which typically comprises bulky and complex optical elements, some of which are located on a magneto-optical head. The optical elements can degrade the signal to noise ratio of the information signal obtained from the polarization rotation.

U.S. Pat. Nos. 5,889,641 and 5,986,978, which are incorporated herein by reference, disclose disk drive systems in which light is delivered from a remote source to a target spot on a disk via an optical channel. However, the optical components of such light delivery systems add complexity and cost to such systems.

The present invention has been developed in view of the foregoing, and to address other deficiencies of the prior art.

SUMMARY OF THE INVENTION

The present invention provides a laser assisted magnetic recording system including a semiconductor laser and magnetic write coil integrally formed into a slider.

An aspect of the present invention is to provide a slider of a magnetic recording apparatus comprising a magnetic recording section, and a semiconductor laser section integrally formed adjacent the magnetic recording section.

An aspect of the present invention is to provide a method of making a slider of a magnetic recording apparatus comprising the steps of providing a semiconductor laser section of the slider, and integrally forming a magnetic recording section adjacent the semiconductor laser section.

These and other aspects of the present invention will be more apparent from the following description.

DETAILED DESCRIPTION

In a preferred laser assisted magnetic recording system of the present invention, a laser diode, a magnetic write coil, and a magnetic reader are integrally fabricated in wafer form and processed into a magnetic recording head or slider. The magnetic structures may be similar to conventional hard disk drive (HDD) heads, with the write coil preferably being optimized for thermo-magnetic recording. In a preferred embodiment, the system is used with perpendicular recording films.

Figure 1:
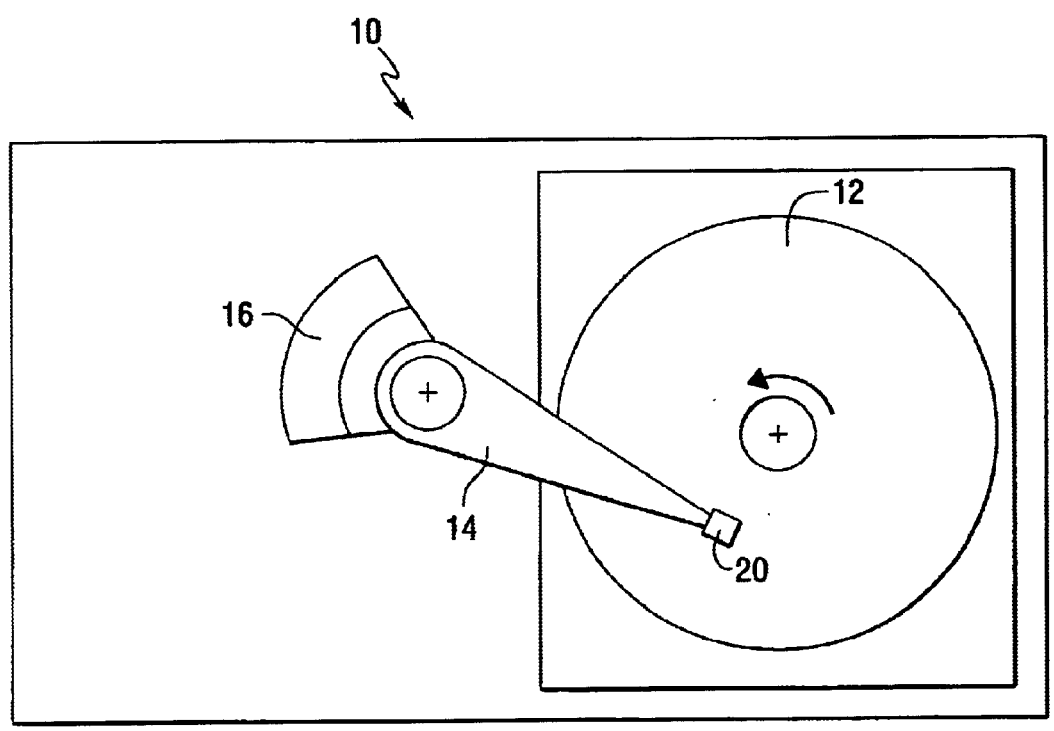
FIG. 1 is a partially schematic top view of a magnetic disk drive system including a laser assisted magnetic recording head in accordance with an embodiment of the present invention.

FIG. 1 illustrates a magnetic hard disk drive 10 including a rotatable magnetic hard disk 12. An actuator arm 14 is connected to a rotary actuator magnet and coil assembly 16. The magnetic hard disk drive 10 includes a magnetic recording head in the form of a slider 20.

Figure 2:
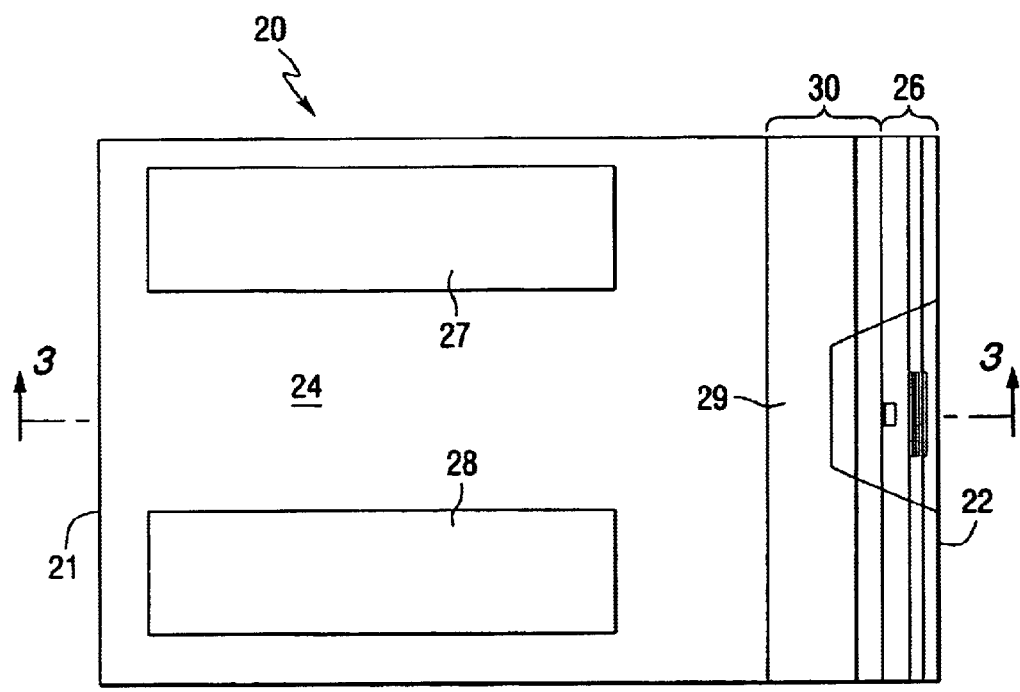
FIG. 2 is a bottom view of a laser assisted magnetic recording head in accordance with an embodiment of the present invention.
Figure 3:
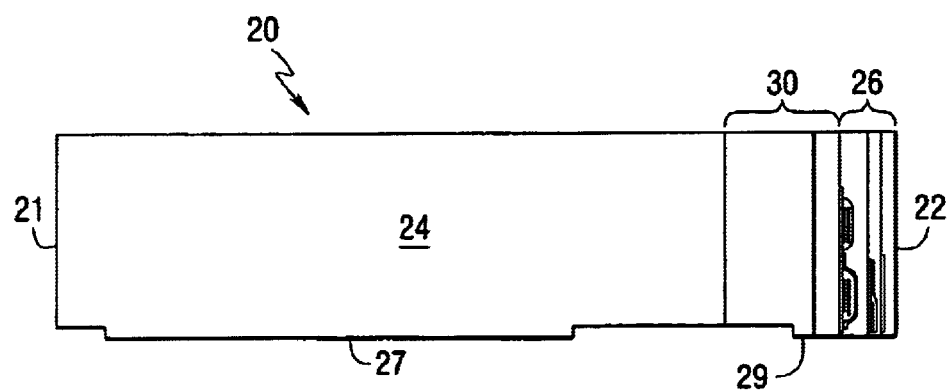
FIG. 3 is a side sectional view taken through line 3—3 of FIG. 2.

FIG. 2 is a bottom view and FIG. 3 is a side sectional view of the slider 20 in accordance with an embodiment of the present invention. The slider 20 includes a leading edge 21, a trailing edge 22 and a main body section 24. The main body section 24 may be made of any suitable material such as silicon, aluminum titanium carbide or gallium arsenide. A magnetic recording section 26 is provided near the trailing edge 22 of the slider 20. The bottom surface of the slider 20 provides an air bearing surface including air bearing surface extensions 27, 28 and 29. A semiconductor laser section 30 is provided between the magnetic recording section 26 and the main body section 24 of the slider 20. The semiconductor laser section 30 may be bonded to the main body section 24 by a suitable adhesive. Alternatively, the main body section 24 and the substrate of the semiconductor laser section 30 may be made from the same material, such as doped gallium arsenide.

Figure 4:
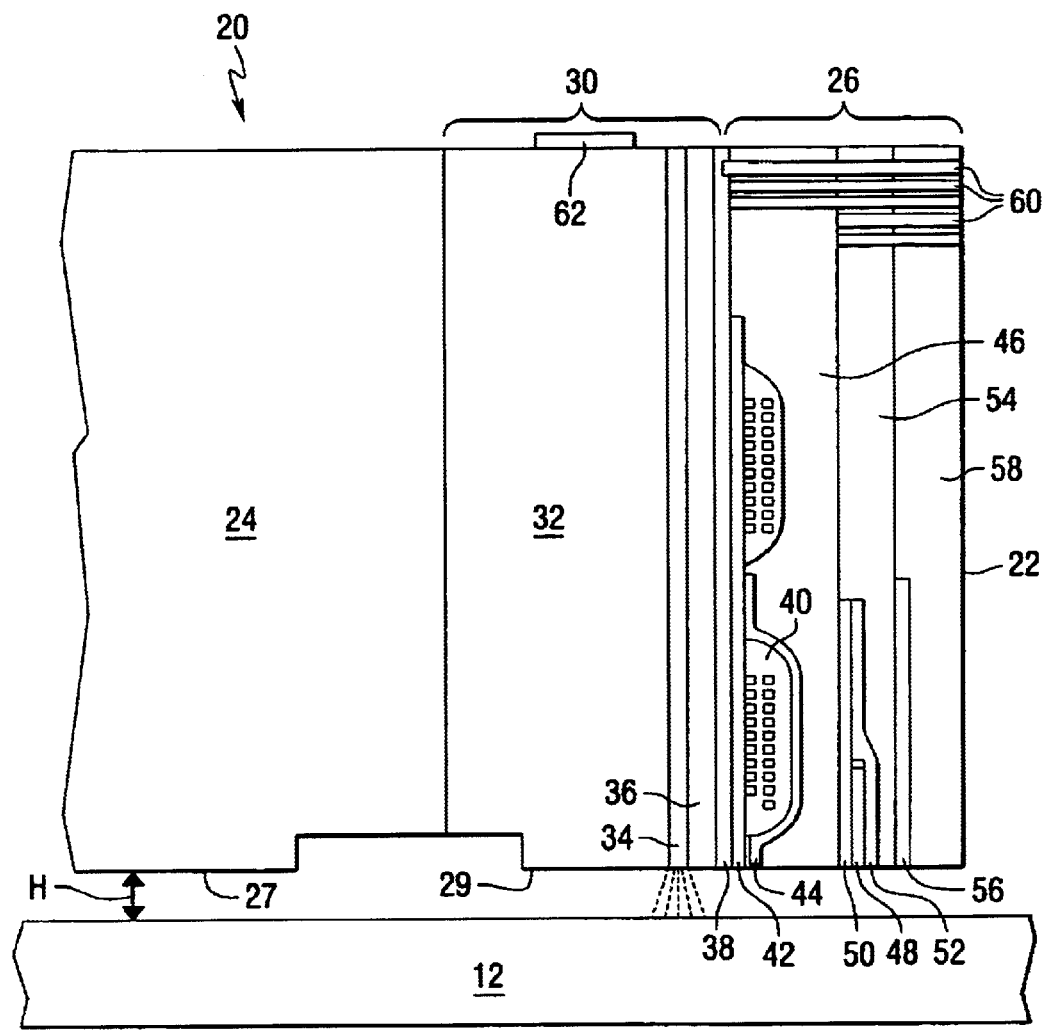
FIG. 4 is a partially schematic side sectional view of a portion of a laser assisted magnetic recording head positioned above a magnetic recording media in accordance with an embodiment of the present invention.

FIG. 4 illustrates the slider 20 positioned over the magnetic hard disk 12 at a flying height H. The laser section 30 of the slider 20 includes a semiconductor laser substrate 32, preferably an n-doped GaAs wafer. An active layer 34 is located between the laser substrate 32 and a semiconductor hetero layer 36, preferably p-doped AlGaAs. A metallization layer 38 is deposited over the p-doped hetero layer 36. As more fully described below, during writing operations, laser radiation is emitted from an emission edge of the active layer 34 toward a region of the magnetic hard disk 12.

As shown in FIG. 4, the magnetic recording section 26 of the slider 20 is integrally formed adjacent the laser section 30. The magnetic recording section 26 includes a write coil 40, a write pole 42 and a top pole 44 of conventional design adjacent the metallization layer 38. An alumina overcoat 46 covers the write coil 40. In the embodiment shown in FIG. 4, the magnetic reader of the magnetic recording section 26 comprises a conventional GMR reader 48 sandwiched between a bottom shield 50 and a top shield 52. Another alumina overcoat 54 covers the GMR reader 48. An optional permanent erase magnet 56 is covered by another alumina overcoat 58. The outer surface of the alumina overcoat 58 forms the trailing edge 22 of the slider 20. Electrical contacts 60 are connected in a known manner to the components of the magnetic recording section 26. An electrical contact pad 62 is connected to the laser substrate 32. Conventional overcoats (not shown) may be applied to the components of the slider 20 in order to protect the structure from wear and corrosion.

During operation of the slider 20, current is supplied to the write coil 40 and simultaneously to the laser section 30 to thereby cause emission of laser energy from the active layer 34 toward the magnetic hard disk 12. During write operations, the laser section 30 is biased above threshold to emit an optical beam from the active layer 34 toward the surface of the media 12. The media 12 is preferably designed to absorb a portion of the laser emission. The local optical absorption raises the temperature in a small area. The media 12 includes magnetic layers which exhibit decreasing coercivity as a function of increasing temperature. The coercivity at room temperature is relatively high, resulting in very stable marks. Preferably, the magnetic writer cannot change the magnetization at room temperature. When the laser is turned on, a region is heated, its coercivity drops, and then the magnetic writer switches the magnetic orientation of the media with a lower field.

In traditional optical and MO storage systems, it is desirable to have the laser wavelength be as short as possible, since the achievable spot area is proportional to the square of the wavelength. This has largely been responsible for the push in reducing laser wavelengths into the red (680 nm, 660 nm and 635 nm), and even further into the blue region (410 nm). However, the new material systems that are needed to produce the shorter wavelengths are not nearly as efficient as the GaAs and AlGaAs materials used in the near infrared region. Consequently, whereas 100 mW single spatial mode lasers are available in the near infrared region, 30 mW is currently achievable at 660 nm, 10 mW at 635 mn, and it is not known if high power lasers will be available at 410 nm. In the present system, since the laser is flying at a distance of only about 100 nm from the disk, the spot size is determined by the physical size of the laser active layer 34, whether this is defined by the facet size of the active layer 34, or by an aperture as more fully described below. Therefore, the present system can advantageously use integral near infrared lasers which are very reliable, and which produce high powers while maintaining single spatial mode behavior. The laser section 30 preferably operates at near-IR wavelengths above 700 nm, more preferably at wavelengths of from about 750 to about 850 nm. Particularly preferred GaAs lasers operate at wavelengths of about 780 and 830 nm.

In the large optical spot/small writer pole embodiment shown in FIG. 4, the write pole defines the lateral extent of the mark. The large optical spot serves to temporarily drop the coercivity. This drop in coercivity allows the use of media materials with higher room temperature coercivity, higher stability and potentially larger signals.

Figure 5:
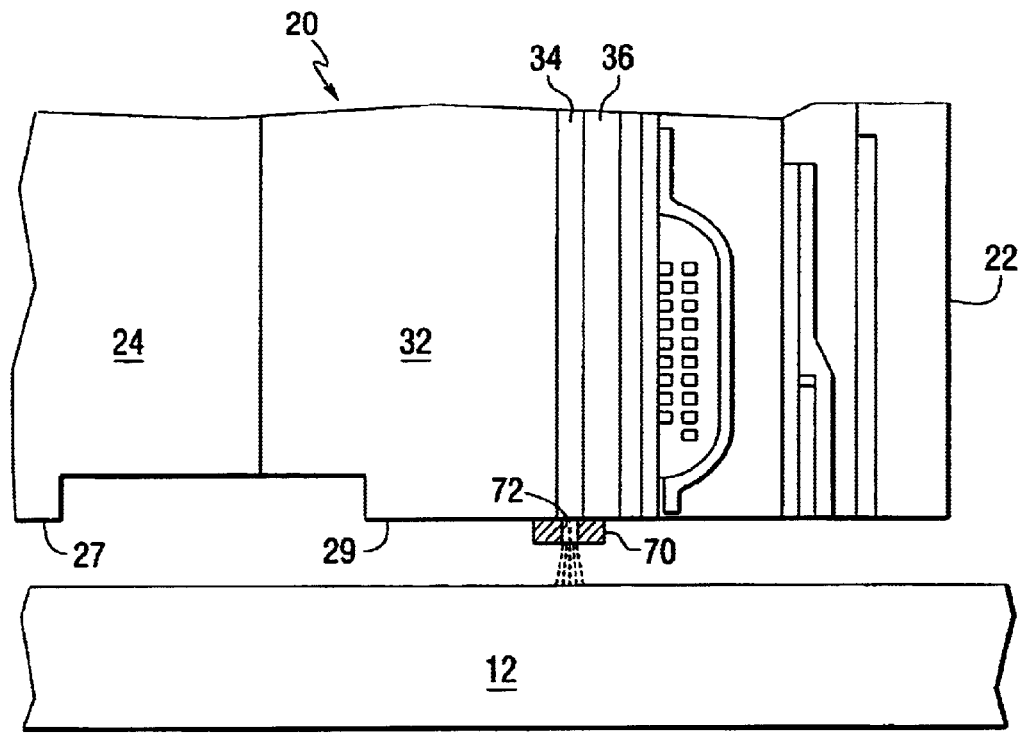
FIG. 5 is a partially schematic side sectional view of a portion of a laser assisted magnetic recording head similar to the embodiment shown in FIG. 4, including a laser aperture for decreasing the laser spot size in accordance with an embodiment of the present invention.
Figure 6:
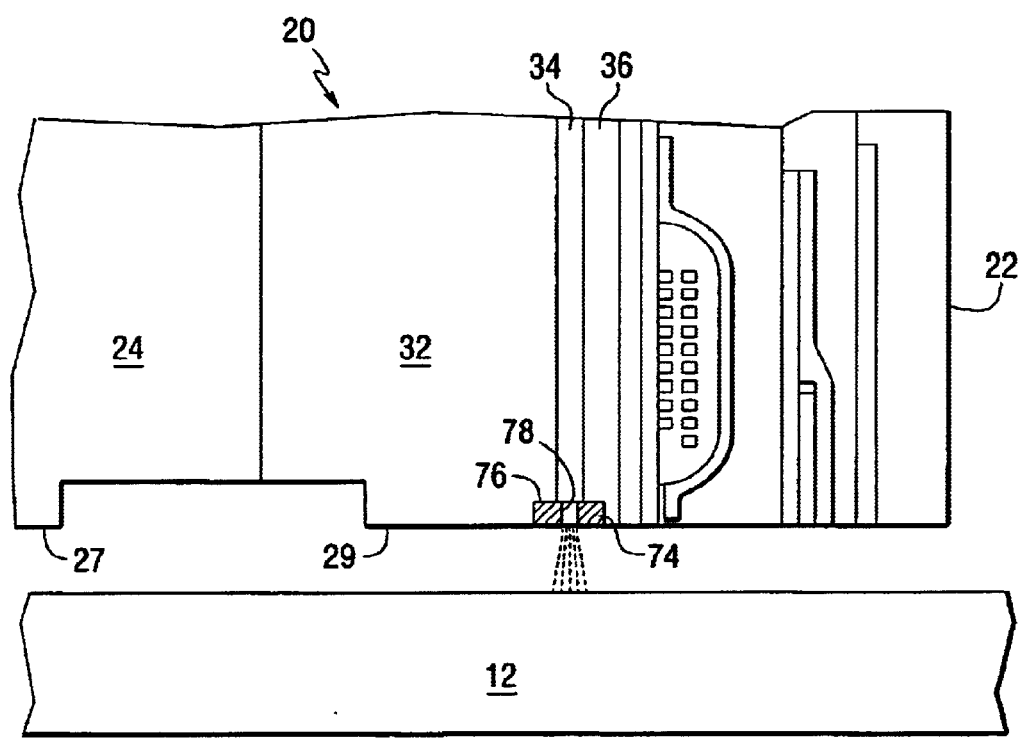
FIG. 6 is a partially schematic side sectional view of a portion of a laser assisted magnetic recording head similar to the embodiment shown in FIG. 5, including a recessed laser aperture for decreasing the laser spot size in accordance with another embodiment of the present invention.

FIGS. 5 and 6 illustrate a slider 20 similar to that shown in FIG. 4, but including apertures for decreasing the laser spot size which impinges the magnetic hard disk 12. In the embodiment shown in FIG. 5, an aperture 70 having a constricted opening 72 is deposited or formed at the bottom of the laser active layer 34 against the air bearing surface extension 29. In the embodiment shown in FIG. 6, a recessed aperture 74 is deposited in a recess 76 etched or milled in the laser substrate 32, laser active layer 34 and hetero layer 36. The recessed aperture 74 similarly includes a constricted opening 78. The aperture openings 72 and 78 may be of any desired size and shape, depending upon the desired laser spot size and configuration. For example, the aperture openings 72 and 78 may be round, square, rectangular or the like.

In the small optical spot/small writer pole embodiments shown in FIGS. 5 and 6, the relatively small optical spot achieved by the laser aperture can produce the advantages above as well as help to confine the heat in the cross-track direction. Since the relatively small optical spot does not heat the neighboring regions, thermal stability may be improved. This has advantages of potentially tighter track pitch and relaxed writer width tolerances. In this embodiment, grooved media may be desirable in order to confine the heat during the transit time from optical heating to writer pole.

Figure 7:
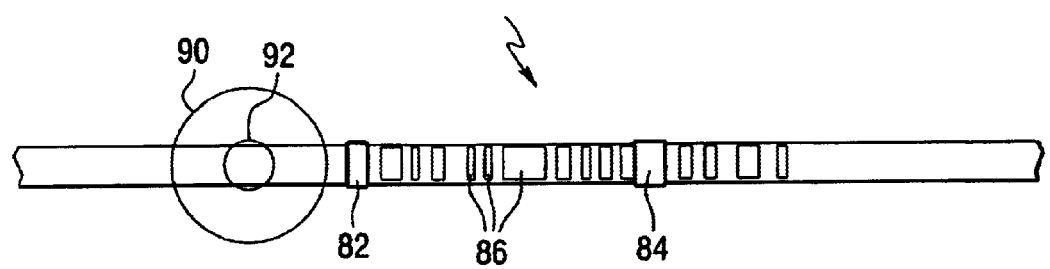
FIG. 7 is a partially schematic top view of a read/write track on a magnetic recording media, illustrating small and large laser spot sizes generated by laser assisted magnetic recording heads in accordance with embodiments of the present invention.

FIG. 7 schematically illustrates a top view of a magnetic hard disk recording track 80. The write pole position 82 and GMR reader position 84 are shown over the recording track 80. Data bits 86 are recorded in the track 80. In FIG. 7, a relatively large laser spot size 90, which would be achieved with a device such as that shown in FIG. 4, is shown in relation to the write pole and GMR reader positions 82 and 84. A relatively small laser spot 92 is also shown in FIG. 7, which would be achieved with laser aperture devices such as those shown in FIGS. 5 and 6. Although round laser spots 90 and 92 are shown in FIG. 7, other spot shapes such as oval, square or rectangular shapes may be used.

Figure 8:
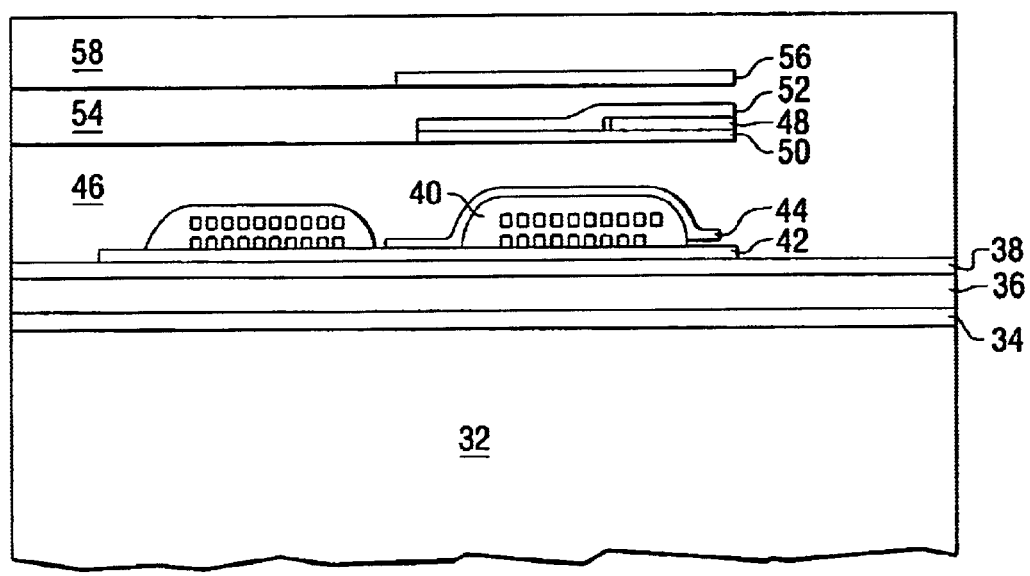
FIG. 8 is a partially schematic side sectional view of fabricated layers which may be further processed to provide a laser assisted magnetic recording head in accordance with an embodiment of the present invention.

FIG. 8 shows a cross section of an integral wafer of the present invention during a stage in its fabrication. The laser active layer 34 and n-doped hetero layer 36 are preferably epitaxially grown on an n-doped GaAs wafer 32. A standard laser index guide (not shown) may be formed by subsequent etch or ion implantation. After deposition of the metallization layer 38 and replanarization, the write coil 40 and write poles 42 and 44 are fabricated in a known manner. The MR or GMR reader 48 is then fabricated by standard techniques. The optional erase permanent magnet 56 is subsequently formed.

The wafer shown in FIG. 8 is subsequently processed into bars by techniques similar to those of conventional HDD heads. Air bearings are formed, e.g., by ion-milling the GaAs wafer 32. The back facet of the laser active layer 34 may be coated to provide a high reflectance. The front facet of the laser active layer 34 may be coated with a conventional anti-reflective coating in order to produce a very efficient device with a relatively large spot at the disk. Alternatively, an aperture, such as shown in FIGS. 5 and 6, may be used to provide a small optical heating spot. The electrical connections are preferably made as in conventional HDD heads, with bondpads brought to the front of the slider.

In the present system, since a laser is integrally built onto each slider, no light-delivery system including optical channels or fibers is needed to bring light to the desired spot on the media, greatly simplifying the drive design. Furthermore, the preferred system provides the ability to use reliable near-IR lasers, e.g., GaAs lasers, as integral components of the sliders.

Whereas particular embodiments of this invention have been described above for purposes of illustration, it will be evident to those skilled in the art that numerous variations of the details of the present invention may be made without departing from the invention as defined in the appended claims.

What is claimed is:

1. A slider of a magnetic recording apparatus comprising:
   a magnetic recording section including a magnetic reader; and
   a semiconductor laser section including an active layer integrally formed adjacent the magnetic recording section.

2. The slider of claim 1, wherein the slider comprises an air bearing surface, and the semiconductor laser section forms at least a portion of the air bearing surface.

3. The slider of claim 1, wherein the laser active layer has an emission edge at a bottom surface of the slider.

4. The slider of claim 3, further comprising a laser aperture over the emission edge of the laser active layer.

5. The slider of claim 1, wherein the semiconductor laser section is attached to a main body section of the slider.

6. The slider of claim 5, wherein the semiconductor laser section and the main body section form an air bearing surface of the slider.

7. The slider of claim 1, wherein the slider comprises a leading edge, and the semiconductor laser section is located between the leading edge and the magnetic recording section.

8. The slider of claim 1, wherein the magnetic recording section and the semiconductor laser section are separated by a metallization layer.

9. The slider of claim 1, wherein the semiconductor laser operates at a wavelength of greater than 700 nm.

10. The slider of claim 1, wherein the semiconductor laser operates at a wavelength between 750 and 850 nm.

11. The slider of claim 1, wherein the magnetic recording section comprises a perpendicular recording head.

12. A method of making a slider of a magnetic recording apparatus comprising the steps of:
    depositing a semiconductor laser section including an active layer on the slider; and
    integrally forming a magnetic recording section including a magnetic reader adjacent the active layer of the semiconductor laser section.

13. The method of claim 12, further comprising the step of forming an air bearing surface from at least a portion of the semiconductor laser section.

14. The method of claim 12, wherein the laser active layer has an emission edge at a bottom surface of the slider.

15. The method of claim 14, further comprising the step of providing a laser aperture over the emission edge of the laser active layer.

16. The method of claim 12, further comprising the step of attaching the semiconductor laser section to a main body section of the slider.

17. The method of claim 16, wherein the semiconductor laser section and the main body section form an air bearing surface of the slider.

18. The method of claim 12, wherein the slider comprises a leading edge, and the semiconductor laser section is located between the leading edge and the magnetic recording section.

19. The method of claim 12, wherein the magnetic recording section and the semiconductor laser section are separated by a metallization layer.

20. The method of claim 12, wherein the semiconductor laser operates at a wavelength between 750 and 850 nm.

* * * * *